United States Patent
Ochi et al.

(10) Patent No.: US 9,215,766 B2
(45) Date of Patent: Dec. 15, 2015

(54) DRIVE DEVICE FOR LIGHT-EMITTING ELEMENT

(75) Inventors: Hideo Ochi, Kawasaki (JP); Nobuhiko Saegusa, Koufu (JP); Katsuhiro Kanauchi, Yonezawa (JP)

(73) Assignees: Pioneer Corporation, Kawasaki-shi, Kanagawa (JP); Tohoku Pioneer Corporation, Tendo-shi, Yamagata (JP)

( * ) Notice: Subject to any disclaimer, the term of this patent is extended or adjusted under 35 U.S.C. 154(b) by 323 days.

(21) Appl. No.: 13/982,632

(22) PCT Filed: Feb. 1, 2011

(86) PCT No.: PCT/JP2011/052036
§ 371 (c)(1),
(2), (4) Date: Aug. 20, 2013

(87) PCT Pub. No.: WO2012/104996
PCT Pub. Date: Aug. 9, 2012

(65) Prior Publication Data
US 2013/0320884 A1    Dec. 5, 2013

(51) Int. Cl.
*H05B 37/02*    (2006.01)
*H05B 33/08*    (2006.01)

(52) U.S. Cl.
CPC ........ *H05B 33/0812* (2013.01); *H05B 33/0851* (2013.01)

(58) Field of Classification Search
CPC .................. H05B 33/0812; H05B 33/0851
See application file for complete search history.

(56) References Cited

U.S. PATENT DOCUMENTS 8,773,038 B2 *   7/2014   Logiudice ................ 315/291
8,773,041 B2 *   7/2014   Chen ....................... 315/291

FOREIGN PATENT DOCUMENTS

| JP | 4-235356 A    | 8/1992  |
| JP | 2000-347613 A | 12/2000 |
| JP | 2002-290215 A | 10/2002 |
| JP | 2004-134231 A | 4/2004  |

* cited by examiner

*Primary Examiner* — Hai L Nguyen
(74) *Attorney, Agent, or Firm* — Drinker Biddle & Reath LLP (57) ABSTRACT

A drive device for a light-emitting element that improves accuracy while driving the light-emitting element at small currents for which a comparatively simple configuration is provided. The drive device includes detecting means, comparing means, a driving voltage source, and offset means. The detecting means detects a voltage corresponding to a current flowing through a first resistor for current detection. The first resistor is coupled to a light-emitting element in series. The comparing means compares a magnitude of the detection voltage of the detecting unit with a comparison voltage. The driving voltage source applies a voltage corresponding to a comparison result by the comparing means to a series circuit of the light-emitting element and the first resistor. The offset means corrects the voltage corresponding to a current flowing through the first resistor by a correction voltage.

12 Claims, 6 Drawing Sheets

DRIVE DEVICE FOR LIGHT-EMITTING ELEMENT

TECHNICAL FIELD

The present invention relates to a drive device that drives a light-emitting element such as a light-emitting diode (LED) and an organic EL element.

BACKGROUND ART

Figure 1:
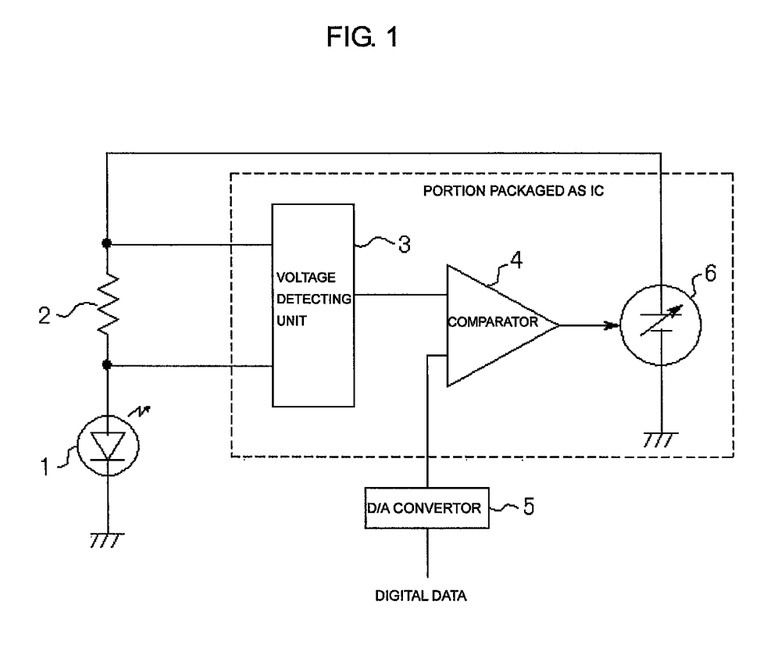
FIG. 1 is a block diagram illustrating a configuration of an LED driver.

FIG. 1 illustrates a general LED driver as a drive device for a known light-emitting element. This LED driver includes a current detecting resistor 2, a voltage detecting unit 3, a comparator 4, a D/A converter 5, and a variable voltage source 6 to drive an LED 1 for light emission.

In the LED driver, the D/A converter 5 receives digital data that indicates a value corresponding to a value of current set to flow through the LED 1. The D/A converter 5 converts the digital data into an analog voltage. This analog voltage is used as a comparison voltage in the comparator 4. In the LED 1, an anode is coupled to one end of the current detecting resistor 2, and a cathode is grounded. The other end of the current detecting resistor 2 is coupled to a positive voltage output of the variable voltage source 6. A negative voltage output of the variable voltage source 6 is grounded. The voltage detecting unit 3 detects a voltage across both terminals of the current detecting resistor 2. The comparator 4 includes one input terminal that receives a detection voltage from the voltage detecting unit 3. The other input terminal of the comparator 4 receives the above-described comparison voltage from the D/A converter 5. The comparator 4 supplies a difference voltage between the detection voltage from the voltage detecting unit 3 and the comparison voltage to the variable voltage source 6. The variable voltage source 6 includes, for example, a switching power supply. The variable voltage source 6 generates a driving voltage, and applies this driving voltage to a series circuit of the current detecting resistor 2 and the LED 1. This allows a current flow through the current detecting resistor 2 and the LED 1. Thus, the LED 1 emits light. The variable voltage source 6 varies the driving voltage corresponding to the difference voltage from the comparator 4.

In the LED driver, a voltage is generated corresponding to a current flowing through the LED 1 across both terminals of the current detecting resistor 2. This voltage is detected as the detection voltage by the voltage detecting unit 3. When the detection voltage is higher than the comparison voltage, the variable voltage source 6 decreases the driving voltage corresponding to the difference voltage. On the other hand, when the detection voltage is lower than the comparison voltage, the variable voltage source 6 increases the driving voltage corresponding to the difference voltage. This operation is continuously performed to control the current flowing through the LED 1 so as to obtain a constant value of current corresponding to the digital data.

The LED driver with this configuration is, for example, described in Patent Literature 1.

CITATION LIST

Patent Literature

Patent Literature 1: Japanese Patent Application Laid-Open No. 2000-347613

SUMMARY OF THE INVENTION

Problems to be Solved by the Invention

Figure 2:
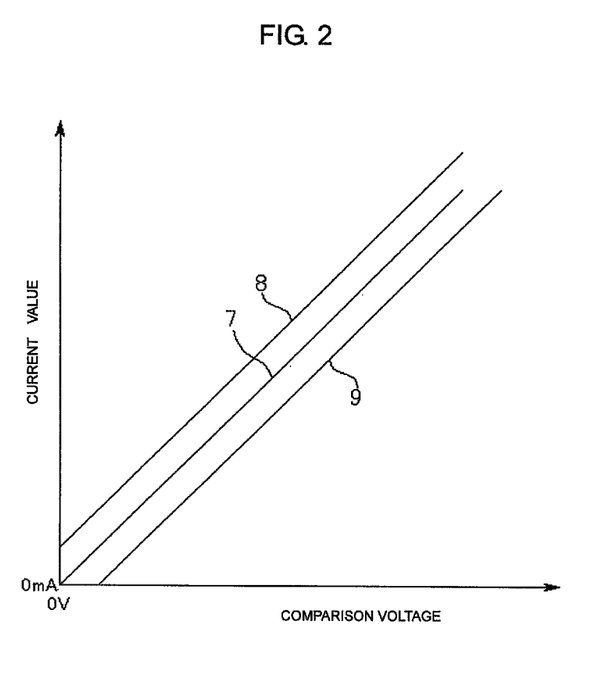
FIG. 2 is a graph illustrating a comparison voltage-current characteristic of the LED driver in FIG. 1.

The known LED driver is generally designed such that the current flowing through the LED 1 becomes zero in the case where digital data is input to set the input terminal for the comparison voltage of the comparator 4 at the minimum voltage. However, the comparator 4 varies in characteristics due to offset. This may cause a current flow by this variation. For example, as denoted by reference numeral 7 in FIG. 2, in the case where a characteristic of the current flowing through the LED 1 with respect to the comparison voltage is an ideal characteristic, offsetting of the comparator 4 allows obtaining a comparison voltage-current characteristic denoted by reference numeral 8 or 9. Here, a problem arises in that a current flows through the LED 1, and the LED 1 emits light even in the case where the comparison voltage is zero V in the characteristic denoted by reference numeral 8. For this reason, in an LED driver where respective portions (portions enclosed by a dashed line in FIG. 1) of the voltage detecting unit 3, the comparator 4, and the variable voltage source 6 are packaged as an IC, performance characteristics in the low-current region is often not guaranteed by the specification.

As a method for simply generating multiple tones from low brightness to high brightness, a pulse-width modulation system that modulates current with a constant amplitude by adjusting a light emission period may be possible. However, use of the LED driver for a lighting fixture and similar apparatus causes a large amount of electromagnetic noise caused by switching ON and OFF the current. This raises the possibility of a non-compliant apparatus.

Accordingly, a desired method avoids pulse-width modulation as much as possible and directly reduces a value of current.

To improve accuracy when driving at small currents, in general, an operational amplifier with a small offset voltage is prepared as a comparator. Alternatively, a device such as a variable resistor is used for individual offset adjustment. On the other hand, cost increase due to these offset countermeasures is concerned. Further, in the LED driver packaged as an IC, even an offset countermeasure itself cannot be taken.

This problem appears not only in the drive device for driving the LED, but also in a drive device for driving another light-emitting element such as an organic EL element.

Therefore, the problems to be solved by the present invention include the aforementioned drawback as an example. It is an object of the present invention to provide a drive device for a light-emitting element that improves accuracy when driving the light-emitting element at small currents in a comparatively simple configuration.

Solutions to the Problems

A drive device for a light-emitting element of the invention according to claim 1 of this application includes a detecting means, a comparing means, and a driving voltage source, the detecting means being configured to detect a voltage corresponding to a current flowing through a first resistor for current detection that is coupled to a light-emitting element in series, the comparing means being configured to compare the magnitude of the detection voltage of the detecting unit with a comparison voltage, and the driving voltage source being configured to apply a voltage corresponding to a comparison result by the comparing means to a series circuit of the light-emitting element and the first resistor. The light emission drive device further includes an offset means configured to correct the voltage corresponding to a current flowing through the first resistor by a correction voltage.

DESCRIPTION OF EMBODIMENTS

With the invention according to claim 1, the detecting means detects the voltage corresponding to the current flowing through the first resistor for current detection as a voltage corrected by the correction voltage. This detection voltage is compared with the comparison voltage. The driving voltage is applied to the series circuit of the first resistor and the light-emitting element corresponding to the comparison result in the configuration. Accordingly, even in the case where the comparing means has an offset, this allows controlling the value of the current flowing through the light-emitting element to obtain a desired value of the current, corresponding to the comparison voltage when driving the light-emitting element at small currents.

DESCRIPTION OF REFERENCE SIGNS

1 LED
2 CURRENT DETECTING RESISTOR
3 VOLTAGE DETECTING UNIT
4 COMPARATOR
6 VARIABLE VOLTAGE SOURCE
12 CONSTANT CURRENT SOURCE

EMBODIMENTS

Hereinafter, a detailed description will be given of embodiments of the present invention with reference to the accompanying drawings.

Figure 3:
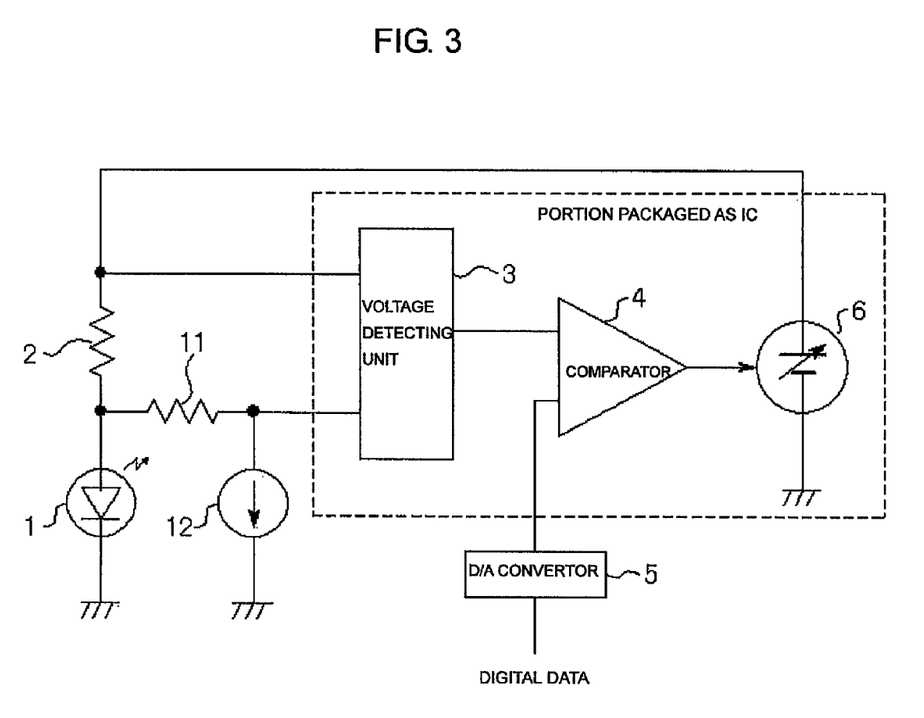
FIG. 3 is a block diagram illustrating a configuration of an LED driver as an embodiment of the present invention.

FIG. 3 illustrates a configuration of an LED driver as an embodiment of the present invention. The LED driver in FIG. 3 includes a resistor 11 and a constant current source 12 in addition to the configuration of the LED driver illustrated in FIG. 1. The resistor 11 has one end coupled to a coupling point between the LED 1 and the current detecting resistor 2, and has the other end coupled to the constant current source 12. The resistor 11 has a value set larger than a resistance value of the current detecting resistor 2. The constant current source 12 is configured to flow a current with a predetermined value through the resistor 11. The voltage detecting unit 3 detects a voltage between: the other end (a terminal at a positive voltage output side of the variable voltage source 6) of the resistor 2, and the coupling point between the resistor 11 and the constant current source 12.

A portion constituted by the resistor 11 and the constant current source 12 corresponds to the offset means.

Configurations of other portions are the same as those of the LED driver illustrated in FIG. 1, and such portions will not be further elaborated here.

In the LED driver according to the present invention with this configuration, a current from the variable voltage source 6 flows through the current detecting resistor 2 and then to earth through the LED 1. The current also flows through the current detecting resistor 2, the resistor 11, and the constant current source 12 to earth. A constant current flows from the constant current source 12 through the resistor nail the time.

The voltage detecting unit 3 detects a summed voltage of the voltage across both terminals of the current detecting resistor 2 and the voltage across both terminals of the resistor 11. The voltage across both terminals of the resistor 11 is a correction voltage that is a constant voltage.

In the case where a detection voltage by the voltage detecting unit 3 is higher than the comparison voltage, the variable voltage source 6 decreases the driving voltage corresponding to the difference voltage. On the other hand, in the case where the detection voltage is lower than the comparison voltage, the variable voltage source 6 increases the driving voltage corresponding to the difference voltage. The driving voltage is applied to a series circuit that includes the resistor 2 and the LED 1. This operation is continuously performed to control the current flowing through the LED 1 so as to obtain a constant value of current corresponding to the digital data.

Figure 4:
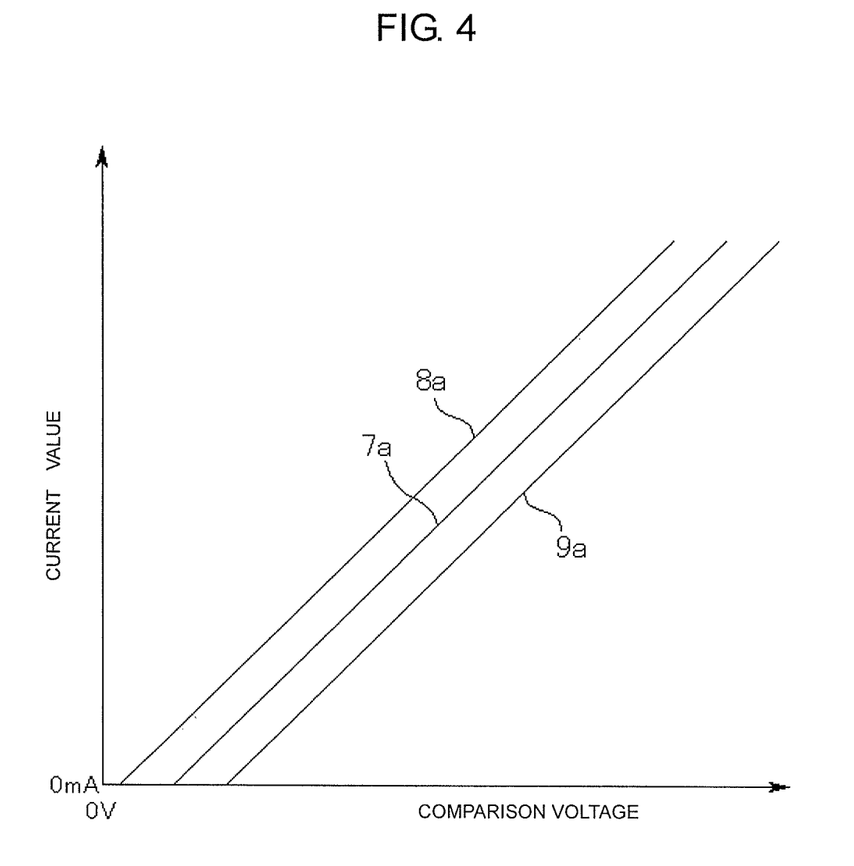
FIG. 4 is a graph illustrating a comparison voltage-current characteristic of the LED driver in FIG. 2.

As illustrated in FIG. 4, a comparison voltage-current characteristic is shifted by the correction voltage with the addition of the voltage across both terminals of the current detecting resistor 2 in a positive direction of the comparison voltage. The respective characteristics denoted by reference numerals 7a, 8a, and 9a in FIG. 4 are illustrated as characteristics shifted with respect to the characteristics denoted by reference numerals 7, 8, and 9 in FIG. 2. As seen from the characteristics in FIG. 4, in a relationship between the comparison voltage and the current flowing through the LED 1, a value of the LED current can take zero with respect to the comparison voltage. Along with an increase in the comparison voltage, the value of the LED current can linearly increase from zero.

The digital data to be input takes a value with the addition of a value corresponding to the correction voltage. Accordingly, the comparison voltage, which is obtained by converting digital data into an analog voltage by the D/A converter 5 to be supplied to the comparator 4, is a voltage obtained by adding the correction voltage to a voltage corresponding to a value of current set to flow through the LED 1. The correction voltage is a voltage higher than the maximum value of the offset voltage. The offset voltage is a voltage generated across both terminals of the resistor 2 in the case where both voltages applied to the two input terminals of the comparator 4 are zero V in the configuration of the LED driver in FIG. 1, that is, an error voltage of the detection voltage.

Figure 5:
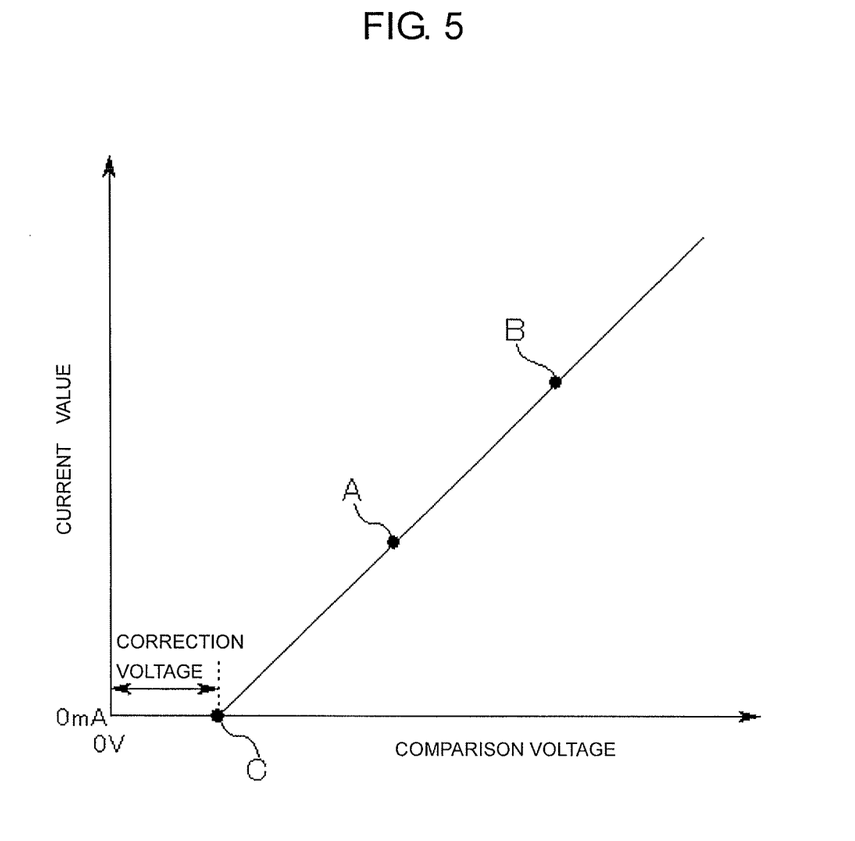
FIG. 5 is a graph illustrating a method for setting a correction voltage.

As a method for setting the correction voltage, for example, respective currents to flow are measured with respect to two different comparison voltages equal to or more than the maximum value of the offset voltage. Subsequently, as illustrated in FIG. 5, a straight line passing through two points A and B of the values of the currents with respect to the comparison voltages as the measurement result is assumed to be a comparison voltage-current characteristic. The voltage where the current is zero in this characteristic (Point C) can be set as an estimated correction voltage.

Thus, in the LED driver according to the present invention, the configuration compares a voltage obtained by adding the correction voltage to the voltage across both terminals of the current detecting resistor with the comparison voltage. Subsequently, the configuration applies a voltage corresponding to the comparison result to the series circuit of the current detecting resistor and the LED. Accordingly, even in the case where the comparator 4 has an offset, this allows controlling the value of the current flowing through the LED 1 to obtain a desired value of the current, corresponding to the comparison voltage when the LED 1 is driven at small currents.

In order to obtain the correction voltage, for example, this configuration is obtained simply by adding the resistor and the constant current source to the configuration of the known LED driver as an advantage. Especially, an LED driver where the portion of the voltage detecting unit 3, the comparator 4 and variable voltage source 6 packaged as an IC has an advantage of using the IC portion as it is.

Figure 6:
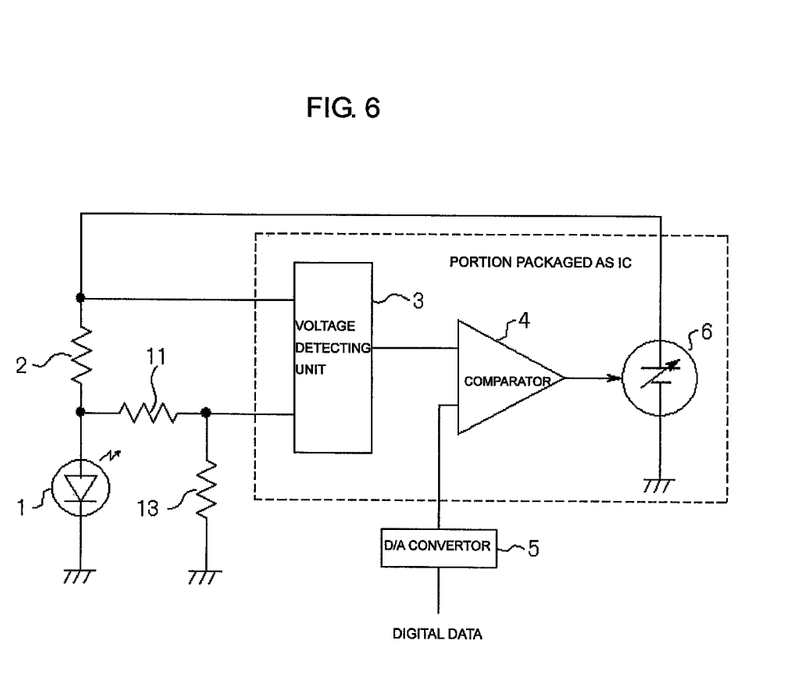
FIG. 6 is a block diagram illustrating a configuration of an LED driver as another embodiment of the present invention.

FIG. 6 illustrates the configuration of an LED driver as another embodiment of the present invention. The LED driver in FIG. 6 includes two resistors 11 and 13 in addition to the configuration of the LED driver illustrated in FIG. 1. The resistor 11 has one end coupled to a coupling point between the LED 1 and the current detecting resistor 2, and has the other end coupled to one end of the resistor 13. The other end of the resistor 13 is grounded. The voltage detecting unit 3 detects a voltage between the other end (a terminal at a positive voltage output side of the variable voltage source 6) of the resistor 2 and the coupling point between the resistor 11 and the resistor 13. That is, this LED driver in this other embodiment has the configuration where the constant current source 12 of the LED driver in FIG. 3 is replaced by the resistor 13.

In the LED driver of FIG. 6, a current flows from the positive voltage output of the variable voltage source 6 through the current detecting resistor 2 and then to earth via the LED 1. The current also flows to earth through the current detecting resistor 2, the resistor 11, and the resistor 13.

The voltage detecting unit 3 detects a summed voltage of the voltage across both terminals of the current detecting resistor 2 and the voltage across both terminals of the resistor 11. The voltage across both terminals of the resistor 11 is a correction voltage. The correction voltage is a higher voltage than the offset voltage, and is determined corresponding to the current that is branched from the current detecting resistor 2 and flows through the resistor 11 and the resistor 13, that is, corresponding to an electric potential of the anode of the LED 1.

In the case where the detection voltage by the voltage detecting unit 3 is higher than the comparison voltage, the variable voltage source 6 decreases the driving voltage corresponding to the difference voltage. On the other hand, in the case where the detection voltage is lower than the comparison voltage, the variable voltage source 6 increases the driving voltage corresponding to the difference voltage. This is similar to that of the LED driver in FIG. 3.

With the LED driver in FIG. 6, the offset unit is constituted simply by adding two resistors 11 and 13 compared with the known LED driver. Accordingly, even in the case where the comparator 4 has an offset, this allows appropriate control of the value of the current flowing through the LED 1 corresponding to the comparison voltage when driving the LED 1 at small currents at a low cost.

While in each embodiment above the exemplary LED driver that drives the LED as the light-emitting element is described, the light-emitting element applicable to the present invention is not limited to this. Another light-emitting element such as an organic EL element may be used.

While in each embodiment described above, the cathode of the LED 1 is directly grounded, the cathode may be grounded via another voltage source (such as an electric power supply of the comparator 4). The comparison voltage is not limited to the output voltage of the D/A converter 5 as it is. The comparison voltage may be obtained by dividing the output voltage of the D/A converter 5.

Additionally, in each embodiment described above, one end of the resistor 2 is coupled to the anode of the LED 1, the other end of the resistor 2 is coupled to the terminal at the positive voltage output side of the variable voltage source 6, and the cathode of the LED 1 and the terminal at the negative voltage output side of the variable voltage source 6 are grounded. However, the following configuration may be employed. One end of the resistor 2 is coupled to the cathode of the LED 1, the other end of the resistor 2 is coupled to the terminal at the negative voltage output side of the variable voltage source 6, and the anode of the LED 1 and the terminal at the positive voltage output side of the variable voltage source 6 are grounded. In this case, the detection voltage is detected as a negative voltage. Accordingly, the detection voltage is a voltage increased to the negative voltage side by the correction voltage.

The drive device of the present invention is applicable to a current-driven illumination device such as an LED illumination device and an organic EL illumination device.

The invention claimed is:

1. A drive device comprising:
   a detecting part configured to detect a voltage corresponding to a current flowing through a first resistor for current detection, the first resistor being coupled to a light-emitting element in series;
   a comparing part configured to compare a magnitude of a detection voltage of the detecting part with a comparison voltage;
   a driving voltage source configured to apply a voltage corresponding to a comparison result by the comparing part to a series circuit of the light-emitting element and the first resistor; and
   an offset part configured to correct the voltage corresponding to a current flowing through the first resistor by a correction voltage,
   the offset part including a series circuit of a second resistor and a constant current source, the second resistor of the series circuit being coupled to a coupling point of the light-emitting element and the first resistor,
   the detecting part being configured to detect a voltage between: a terminal of the first resistor opposite to a terminal thereof coupled to the second resistor, and a coupling point between the second resistor and the constant current source.

2. The drive device according to claim 1, wherein the correction voltage is larger than a maximum value of an error voltage of the detection voltage caused by an offset of the comparing part.

3. The drive device according to claim 2, wherein the correction voltage is set such that respective currents flowing through the light-emitting element are measured with respect to two different values of the comparison voltage, the two different values being equal to or more than the maximum value of the error voltage of the detection voltage, and a value of the correction voltage is estimated as a value of the comparison voltage where a value of current is zero corresponding to the two different values of the comparison voltage and the respective values of current as the measurement result for the two different values of the comparison voltage.

4. The drive device according to claim 2, wherein the comparison voltage is a voltage obtained by an adding correction, the adding correction adding the correction voltage to a voltage corresponding to a value of a current to flow through the light-emitting element.

5. The drive device according to claim 1, wherein the correction voltage is a constant voltage.

6. The drive device according to claim 5, wherein the comparison voltage is a voltage obtained by an adding correction, the adding correction adding the correction voltage to a voltage corresponding to a value of a current to flow through the light-emitting element.

7. The drive device according to claim 1, wherein the comparison voltage is a voltage obtained by an adding correction, the adding correction adding the correction voltage to a voltage corresponding to a value of a current to flow through the light-emitting element.

8. A drive device comprising:
a detecting part configured to detect a voltage corresponding to a current flowing through a first resistor for current detection, the first resistor being coupled to a light-emitting element in series;
a comparing part configured to compare a magnitude of a detection voltage of the detecting part with a comparison voltage;
a driving voltage source configured to apply a voltage corresponding to a comparison result by the comparing part to a series circuit of the light-emitting element and the first resistor; and
an offset part configured to correct the voltage corresponding to a current flowing through the first resistor by a correction voltage,
the offset part including a series circuit of a second resistor and a third resistor, the second resistor of the series circuit being coupled to a coupling point of the light-emitting element and the first resistor,
the detecting part being configured to detect a voltage between: a terminal of the first resistor opposite to a terminal thereof coupled to the second resistor, and a coupling point between the second resistor and the third resistor.

9. The drive device according to claim 8, wherein the comparison voltage is a voltage obtained by an adding correction, the adding correction adding the correction voltage to a voltage corresponding to a value of a current to flow through the light-emitting element.

10. The drive device according to claim 8, wherein the correction voltage is larger than a maximum value of an error voltage of the detection voltage caused by an offset of the comparing part.

11. The drive device according to claim 10, wherein the correction voltage is set such that respective currents flowing through the light-emitting element are measured with respect to two different values of the comparison voltage, the two different values being equal to or more than the maximum value of the error voltage of the detection voltage, and a value of the correction voltage is estimated as a value of the comparison voltage where a value of current is zero corresponding to the two different values of the comparison voltage and the respective values of current as the measurement result for the two different values of the comparison voltage.

12. The drive device according to claim 10, wherein the comparison voltage is a voltage obtained by an adding correction, the adding correction adding the correction voltage to a voltage corresponding to a value of a current to flow through the light-emitting element.

* * * * *